C. W. ARMBRUST.
BRAKE HEAD.
APPLICATION FILED JULY 26, 1911.
1,024,112.
Patented Apr. 23, 1912.
2 SHEETS—SHEET 1.
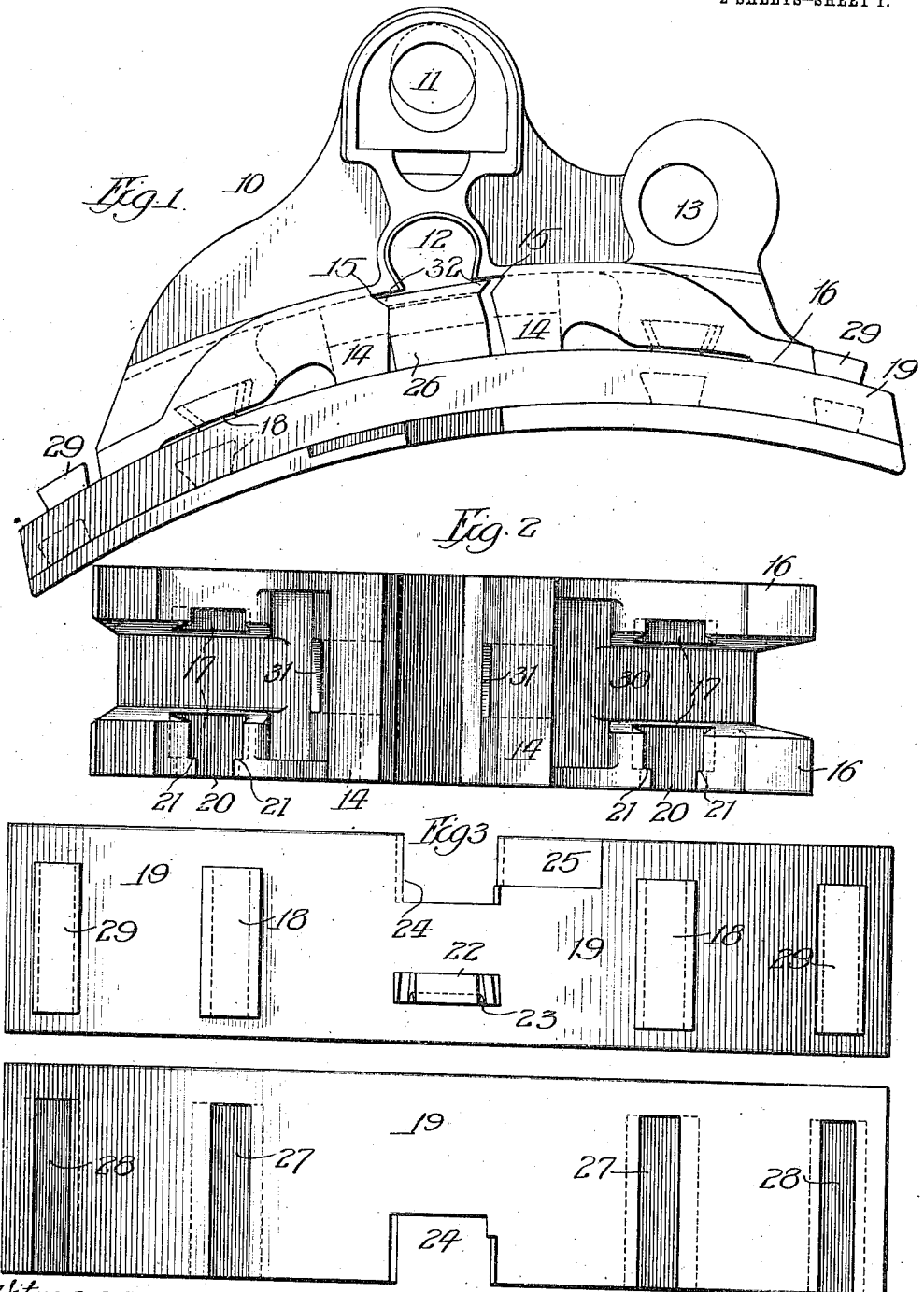

C. W. ARMBRUST.
BRAKE HEAD.
APPLICATION FILED JULY 26, 1911.
1,024,112.
Patented Apr. 23, 1912.
2 SHEETS—SHEET 2.
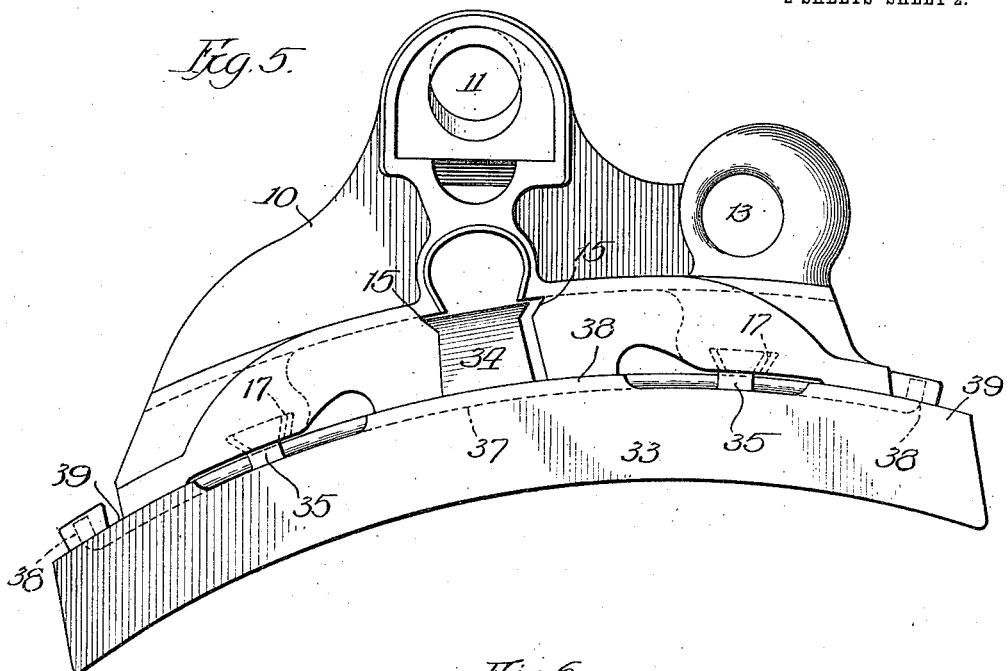
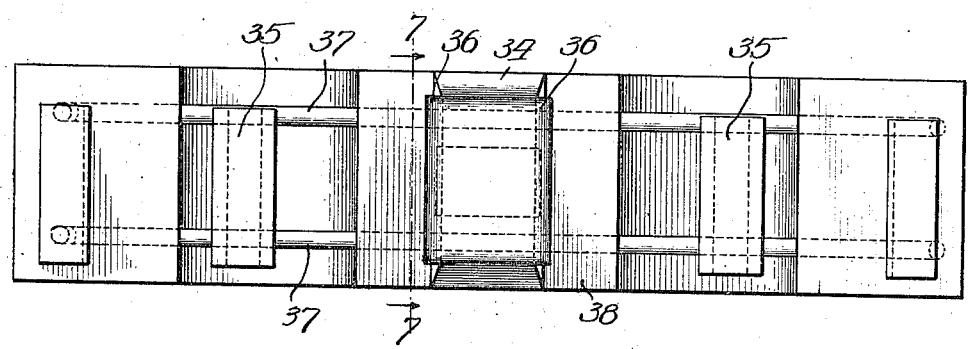
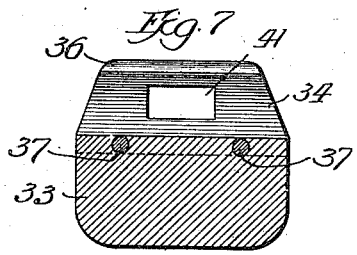
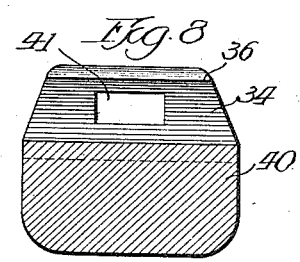
Witnesses
Inventor:
Charles W. Armbrust

UNITED STATES PATENT OFFICE.

CHARLES W. ARMBRUST, OF CRYSTAL LAKE, ILLINOIS, ASSIGNOR OF ONE-HALF TO HARRIET W. ARMBRUST, OF NORTH CRYSTAL LAKE, ILLINOIS.

BRAKE-HEAD.

1,024,112.

Specification of Letters Patent. Patented Apr. 23, 1912.

Application filed July 26, 1911. Serial No. 640,631.

*To all whom it may concern:*

Be it known that I, CHARLES W. ARMBRUST, a citizen of Crystal Lake, in the county of McHenry and State of Illinois, have invented certain new and useful Improvements in Brake-Heads, of which the following is a specification.

This invention relates to brake heads and aims to produce a device of this character so constructed that any of the well known types of brake shoes, solid or interlocking, may be attached thereto and also particularly adapted for use with shoes provided with locking lugs, the brake head being provided with undercut recesses with which the locking lugs will interlockingly engage to hold the shoe to the head and also prevent lateral displacement of the shoe relatively to the head.

My invention aims also to produce a brake head to which a brake shoe can be attached without the employment of the usual attaching key and which will permit the shoe to be attached by sliding the same into the brake head from the side thereof but which permits a limited relative movement between the head and the shoe sufficient to effect locking engagement of the shoe and prevent the same from becoming laterally displaced.

My improved brake head is capable of use with brake shoes having either integrally attached lugs or detachable attaching lugs. It embodies both strength and durability and at the same time is as light in weight as is permitted by the strength required and, furthermore, it is designed to meet all of the M. C. B. requirements.

My invention will be best understood by reference to the following description when considered in connection with the accompanying drawings illustrating those embodiments which, at the present time, appear to be preferable.

Referring to the drawings Figure 1 is a side elevation of a brake head embodying my invention and showing a pair of interlocking brake shoes attached thereto; Fig. 2 is a face view of the brake head shown in Fig. 1 with the brake shoes removed; Fig. 3 is a back view of one of the shoes shown in Fig. 1; Fig. 4 is a face view of the shoe shown in Fig. 3; Fig. 5 is a side elevation of a brake head and showing a different form of shoe attached thereto; Fig. 6 is a back view of the shoe shown in Fig. 5; Fig. 7 is a sectional view taken on the line 7—7 of Fig. 6; and Fig. 8 is a similar view of a modified form of the shoe shown in Fig. 7.

On the drawings 10 designates, in general, the body of the brake head which is provided with the usual truss rod bearing 11, the hanger opening 12, and the brake hook receiving opening 13. The attaching prongs 14 project downwardly on either side of the brake beam bearing and each of the prongs is undercut at its base or provided with a groove 15 for a purpose hereinafter described. The end prongs 16 have longer flat lower bearing faces than is customary with the ordinary types of brake head and each is provided on its lower face, preferably at some distance from the end, with a transversely extending locking recess 17 adapted to receive the locking lugs 18 of an interlocking brake shoe 19. The entrance 20 of each of the recesses is preferably made just large enough to receive the locking lugs 18, but beyond the entrance, the recesses are widened or enlarged as shown in Fig. 2 to permit of a limited longitudinal movement of the brake shoe relative to the brake head. One end of the enlarged portion of the recess is closed, as shown, to prevent the shoe from becoming laterally displaced relatively to the head in that direction, while at the opposite end of the enlarged portion, shoulders 21 are formed which engage with the ends of the locking lugs 18 when the shoe is moved slightly longitudinally of the brake head to prevent the locking lugs from sliding out through the entrance 20, thereby holding the shoe against lateral displacement on that side of the brake head.

The shoe disclosed in Figs. 3 and 4 is of the interlocking type which is adapted to be engaged with a similarly shaped shoe upon relative transverse movement of the shoes. The body portion of the shoe is provided with the upwardly projecting attaching stud 22 provided with a groove 23 and one side of the shoe is recessed as indicated at 24 to receive the stud 22 of a similarly shaped shoe. A depression 25 is formed adjacent the recess 24 to permit the detachable attaching lug 26 (Fig. 1) to be engaged with the attaching studs 22 of the interlocked shoes. The face of the shoe is provided with locking recesses 27 adapted to receive the locking lugs 18 of a similarly shaped shoe and also with locking recesses 28 to receive the attaching lugs 29 of a similarly shaped shoe the latter also serving as thrust lugs when said shoe is locked to the brake head.

A groove, or depression 30 extends longitudinally of the brake head to receive the locking key (not shown) in case it is desired to use such key and the attaching prongs 14 are provided with key-way openings 31 through which the locking key passes. The detachable attaching lug 26 is provided near its top with outwardly projecting ribs 32 adapted to engage in the grooves 15 formed at the base of the attaching prongs. As shown in Fig. 1, the space between the attaching prongs 14 is larger than the attaching lug 26 so that said lug may be moved with the brake shoe longitudinally of the brake head to effect the locking engagement between the locking lugs 18 and the undercut walls of the locking recesses 17. The locking lugs and the attaching stud, by reason of their sliding engagement with the brake head, are sufficient to securely lock the brake shoes to the brake head without the employment of an attaching key, but the brake head is adapted to be employed with shoes different from that above described and is formed to accommodate the attaching key in case it is desirable to use a shoe requiring such key.

When shoes are to be attached to the brake head they are first interlockingly engaged with each other by slipping the locking lugs 18 and 29 into the locking recesses 27 and 28 respectively of a similarly shaped shoe, the attaching stud 22 entering the recess 24 provided in the side of the shoe. The detachable attaching lug 26 is then engaged with the studs 22 of each shoe by sliding the same longitudinally of the shoes so that the ribs (not shown) with which the lug is provided engage in the grooves 23 of the studs 22. The interlocked shoes are then attached to the brake head by sliding the same transversely of the head so that the locking lugs 18 on the upper shoe slip into the locking recesses 17 while the attaching lug slides into the space between the attaching prongs. It will be evident that slight longitudinal movement of the shoe in either direction relatively to the brake head, will cause the ends of the locking lugs 18 to engage behind the shoulders 21 and thus hold the shoes against lateral displacement relatively to the brake head.

The brake head disclosed in Fig. 5 is substantially identical in all respects with that previously described. The brake shoe 33, however, is not of the interlocking type but is a cast shoe provided with the integral attaching lug 34 and the locking lugs 35. The attaching lug is provided with the transversely extending ribs 36 adapted to engage in the grooves 15 of the brake head and the locking lugs 35 are shaped to engage in the locking recesses 17 of the brake head. In order to strengthen the shoe and to hold the parts together in case the shoe should become cracked or fractured, I have provided reinforcing members 37 extending longitudinally of the shoe adjacent the back thereof, the end members being bent upwardly as indicated at 38, within the thrust lugs if preferred. These members also serve to materially strengthen the bases of the locking lugs 35 so that the said lugs will not be broken away from the shoe body when the shoe is nearly worn away. The back of the shoe is elevated at the center, as indicated at 38, and at the ends, as indicated at 39, for the purpose of spacing the prongs of the brake head away from the body of the shoe so that the shoe may be worn entirely away without wearing into the brake head.

In Fig. 8 I have shown a brake shoe 40, substantially similar in all respects to the brake shoe 33 shown in Figs. 5, 6 and 7, except that the reinforcing elements 37 are omitted. The attaching lugs 34 of both of these shoes are preferably provided with a key-way opening 41 to receive an attaching key if it should be found desirable to use same.

It will be evident that shoes of other types than those shown and described may be employed with my improved brake head and that while the attaching key is not necessary to lock those types of shoes to the brake head, said head is constructed to receive a locking key and such key may be used in case it is required by the character of the shoe employed.

It will be apparent that the brake head itself is capable of considerable modification without departing from the spirit of or sacrificing any of the material advantages of the invention.

I claim:

1. A brake head provided with locking recesses adapted to receive the locking lugs of a brake shoe and undercut to permit limited longitudinal movement of the shoe relatively to the brake head.

2. A brake head provided with locking recesses adapted to receive the locking lugs of a brake shoe, said recesses being provided with shoulders to prevent lateral displacement of the shoe relatively to the brake head.

3. A brake head having end prongs provided with locking recesses adapted to receive the locking lugs of a brake shoe, said recesses being undercut to permit limited longitudinal movement of said shoe relatively to the brake head and to prevent lateral displacement of said shoe.

4. A brake head having end prongs provided with recesses adapted to receive the locking lugs of a brake shoe, said recesses being provided with shoulders to prevent lateral displacement of the shoe relatively to the brake head.

5. A brake head provided with locking recesses adapted to receive the locking lugs of a brake shoe, and having means integral therewith to prevent lateral displacement of the shoe relatively to the brake head.

6. A brake head provided with locking recesses adapted to receive the locking lugs of a brake shoe, the entrance to said recesses being smaller than the main portion thereof, whereby to permit limited longitudinal movement of the brake shoe relatively to the brake head and prevent lateral displacement of said shoe.

7. A brake head comprising attaching prongs and end prongs, said attaching prongs being provided with grooves for interlocking engagement with the attaching lug of a brake shoe, said end prongs having locking recesses adapted to receive the locking lugs of a brake shoe and formed to engage with the ends of said locking lugs to prevent lateral displacement of the shoe.

8. The combination of a brake head provided with transversely disposed locking recesses adapted to receive the similarly disposed locking lugs of a brake shoe, and a brake shoe having locking lugs interlockingly engaged with said recesses, but capable of longitudinal movement whereby lateral displacement of said shoe relatively to said brake head is prevented.

9. The combination of a brake head comprising attaching prongs and end prongs having locking recesses for interlocking engagement with the attaching lug and locking lugs of a brake shoe, and a brake shoe comprising a body portion provided with integral locking lugs and an integral attaching lug interlockingly engaged with said brake head, said shoe being capable of limited longitudinal movement relatively to the brake head, whereby the shoe is locked against lateral displacement relative to the brake head.

10. The combination of a brake head comprising attaching prongs and end prongs, each of said attaching prongs being provided with grooves and each of said end prongs being provided with locking recesses, and a brake shoe comprising a body portion having a reinforcing element embedded therein and locking lugs and an attaching lug formed integrally with said body portion, said attaching lug being interlockingly engaged with the grooves in said attaching prongs and said locking lugs being interlocking engaged in said recesses of the end prongs and said recesses having shoulders for engagement with the ends of said locking lugs to prevent lateral displacement of the brake shoe relative to the brake head.

11. A brake head having attaching prongs and end prongs spaced apart, said end prongs and attaching prongs being provided with recesses to receive the locking lugs of a brake shoe and permit limited longitudinal movement of the shoe relatively to the brake head.

CHARLES W. ARMBRUST.

Witnesses:
 IRA J. WILSON,
 M. ROBERTSON.

---

Copies of this patent may be obtained for five cents each, by addressing the "Commissioner of Patents, Washington, D. C."